United States Patent
Chikagawa et al.

(10) Patent No.: US 9,085,217 B2
(45) Date of Patent: Jul. 21, 2015

(54) JET PUMP HAVING SCROLL SHAPED FLOW PATH

(75) Inventors: Noriyuki Chikagawa, Tokyo (JP); Asuka Sakaguchi, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 254 days.

(21) Appl. No.: 13/320,609

(22) PCT Filed: Jun. 9, 2010

(86) PCT No.: PCT/JP2010/059766
§ 371 (c)(1), (2), (4) Date: Nov. 15, 2011

(87) PCT Pub. No.: WO2011/001800
PCT Pub. Date: Jan. 6, 2011

(65) Prior Publication Data
US 2012/0057993 A1    Mar. 8, 2012

(30) Foreign Application Priority Data
Jun. 29, 2009   (JP) ................. 2009-153751

(51) Int. Cl.
*F04F 5/20* (2006.01)
*F04F 5/46* (2006.01)
(Continued)

(52) U.S. Cl.
CPC ............ *B60H 1/00792* (2013.01); *B60H 1/248* (2013.01); *F04F 5/20* (2013.01); *F04F 5/42* (2013.01); *F04F 5/44* (2013.01);
(Continued)

(58) Field of Classification Search
CPC ................ F04F 5/20; F04F 5/46; F04F 5/42; F04F 5/44

USPC .................... 417/151, 171, 172, 177, 198, 87
See application file for complete search history.

(56) References Cited

U.S. PATENT DOCUMENTS 2,310,265 A * 2/1943 Sweeny ..................... 406/194
2,663,243 A   12/1953 Wunderlich
(Continued)

FOREIGN PATENT DOCUMENTS

DE    2504436 A1    12/1975
EP    1504937 A1    2/2005
(Continued)

OTHER PUBLICATIONS

JP 2005-280433 Machine English Translation; Yasunari, Oct. 13, 2005.*
(Continued)

*Primary Examiner* — Bryan Lettman
*Assistant Examiner* — Timothy P Solak
(74) *Attorney, Agent, or Firm* — Westerman, Hattori, Daniels & Adrian, LLP

(57) ABSTRACT

An aspirator is provided that includes a nozzle that aspirates secondary air; a main body that forms a scroll-shaped airflow path on the outer circumference of the nozzle; a primary-air inflow path that tangentially communicates with the airflow path; and a diffuser that is connected to an open end of the main body and has a throat portion at which a tip portion of the nozzle is disposed. An inner wall of the primary-air inflow path, which communicates with the scroll-shaped airflow path, is offset outward from the center of the nozzle, and primary air introduced from the primary-air inflow path flows into the scroll-shaped airflow path from one direction.

4 Claims, 5 Drawing Sheets

(51) Int. Cl.

| | | |
|---|---|---|
| *F04F 5/42* | (2006.01) | |
| *F04F 5/44* | (2006.01) | |
| *B60H 1/00* | (2006.01) | |
| *B60H 1/24* | (2006.01) | |
| *F24F 13/26* | (2006.01) | |

(52) U.S. Cl.
 CPC *F04F 5/46* (2013.01); *F24F 13/26* (2013.01); *G01K 2201/02* (2013.01)

(56) References Cited

U.S. PATENT DOCUMENTS

| | | | | |
|---|---|---|---|---|
| 3,099,965 A | * | 8/1963 | Regenscheit | 417/197 |
| 3,321,891 A | * | 5/1967 | Coanda | 96/17 |
| 4,019,834 A | * | 4/1977 | Teodorescu | 417/84 |
| 4,112,695 A | * | 9/1978 | Chang et al. | 405/163 |
| 4,227,863 A | * | 10/1980 | Sommerer | 417/169 |
| 4,435,129 A | * | 3/1984 | Mika et al. | 417/151 |
| 4,623,090 A | * | 11/1986 | Heger | 236/49.1 |
| 6,296,454 B1 | * | 10/2001 | Schmid et al. | 417/151 |

FOREIGN PATENT DOCUMENTS

| | | |
|---|---|---|
| JP | 05-79500 A | 3/1993 |
| JP | 5-155227 A | 6/1993 |
| JP | 2003-320844 A | 11/2003 |
| JP | 2005-280433 A | 10/2005 |

OTHER PUBLICATIONS

International Search Report of PCT/JP2010/059766, mailing date Jul. 6, 2010.
Decision to Grant a Patent dated Feb. 25, 2014, issued in Japanese Patent Application No. 2009-153751 (3 pages).
Decision to Grant a Patent dated Mar. 3, 2014, issued in Chinese Patent Application No. 201080022415.9 (2 pages).
Extended European Search Report dated Apr. 2, 2014, issued in European Patent Application No. 10793970.4 (6 pages).

* cited by examiner a - a

JET PUMP HAVING SCROLL SHAPED FLOW PATH

TECHNICAL FIELD

The present invention relates to an aspirator suitable for use in a vehicle air conditioner and to a vehicle air conditioner using the same.

BACKGROUND ART

In vehicle air conditioners, an aspirator that produces a reduced-pressure state through a Venturi effect by using fluid is used in order to guide vehicle interior air to a portion where a temperature sensor is installed for detecting a vehicle interior temperature. In general, the aspirator includes a nozzle that aspirates secondary air, that is, vehicle interior air, into the portion where the vehicle interior temperature sensor is installed; a main body that forms an airflow path at the outer circumference of the nozzle so as to surround the nozzle; a primary-air inflow path that communicates with the airflow path of the main body and into which part of an airflow is made to flow from an air conditioning unit; and a diffuser that is connected to an open end of the main body and has a throat portion in the vicinity of which the tip of the nozzle opens.

The following aspirators have been proposed as this kind of aspirator: an aspirator in which the axis of the nozzle, which aspirates secondary air, is aligned with a maximum-wind-speed portion of the wind speed distribution of the primary air in the throat portion of the diffuser, in order to increase the amount of aspirated secondary air (see Japanese Unexamined Patent Application, Publication No. Hei-5-155227); and an aspirator in which the center line of the primary-air inflow path is provided eccentrically with respect to the central axis of the main body, and the primary air is turned into a swirling flow in the main body, thereby increasing the wind speed in the throat portion of the diffuser and increasing the amount of aspirated secondary air (see Japanese Unexamined Patent Application, Publication No. 2005-280433).

CITATION LIST

Patent Literature

Japanese Unexamined Patent Application, Publication No. Hei-5-155227
Japanese Unexamined Patent Application, Publication No. 2005-280433

SUMMARY OF INVENTION

Technical Problem

However, in the aspirator disclosed in PTL 1, the axis of the nozzle, which aspirates secondary air, is disposed only at a position where the wind speed distribution of the primary air in the throat portion of the diffuser becomes the maximum to achieve improved aspirator performance. This structure does not increase the wind speed of primary air in the throat portion of the diffuser. Therefore, there are limitations to improving the performance.

On the other hand, in the aspirator disclosed in PTL 2, a swirling flow is imparted to the primary air to increase the wind speed in the throat portion of the diffuser, and the amount of aspirated secondary air corresponding thereto can be increased. However, only with the structure in which the center line of the primary-air inflow path is provided eccentrically with respect to the central axis of the main body, the primary air introduced from the primary-air inflow path to the main body flows from the right and left into the cylindrical airflow path formed around the nozzle, and, therefore, the primary air flows collide with each other on the way. Thus, there is a problem in that a sufficient swirling flow cannot be imparted, and the effect thereof is reduced by half. In particular, when the aspirator is used both for a right-hand-drive vehicle and a left-hand-drive vehicle, a difference in the inflow direction of the primary air occurs, and thus, a prominent backflow is likely to occur in the airflow path.

The present invention has been made in view of such circumstances, and an object thereof is to provide an aspirator capable of increasing the amount of aspirated secondary air and improving performance and to provide a vehicle air conditioner using the same.

Solution to Problem

In order to solve the above-described problems, the aspirator and the vehicle air conditioner using the same of the present invention employ the following solutions.

Specifically, according to one aspect, the present invention provides an aspirator including: a nozzle that aspirates secondary air; a main body that is provided so as to surround the outer circumference of the nozzle and that forms a scroll-shaped airflow path around the nozzle; a primary-air inflow path that tangentially communicates with the scroll-shaped airflow path; and a diffuser that is connected to an open end of the main body and has a throat portion at which a tip portion of the nozzle is disposed, in which an inner wall of the primary-air inflow path, which communicates with the scroll-shaped airflow path, is offset outward from the center of the nozzle; and primary air introduced from the primary-air inflow path flows into the scroll-shaped airflow path from one direction.

According to the above-described aspect, the inner wall of the primary-air inflow path, which tangentially communicates with the scroll-shaped airflow path formed on the outer circumference of the nozzle, is offset outward from the center of the nozzle, which aspirates secondary air, and the primary air introduced from the primary-air inflow path flows into the scroll-shaped airflow path from one direction. Therefore, the flow of the primary air introduced from the primary-air inflow path to the main body is guided by the outer circumferential surface of the nozzle in one direction, becomes a swirling flow along the scroll-shaped airflow path, and flows from the open end of the nozzle into the throat portion of the diffuser, and secondary air is aspirated via the nozzle through the Venturi effect in the throat portion. The primary air flowing via the throat portion flows along the inner surface of the diffuser, is reduced in pressure, and flows to the outside. Thus, it is possible to increase the flow speed of the primary air flowing into the throat portion of the diffuser via the scroll-shaped airflow path to enhance the Venturi effect in the throat portion, thereby increasing the amount of aspirated secondary air and improving the performance of the aspirator.

In the above-described aspirator, the main body may be provided with a rib that extends from the inner wall of the primary-air inflow path to an outer circumferential surface of the nozzle and that partitions the scroll-shaped airflow path.

According to the above-described aspect, the rib that extends from the inner wall of the primary-air inflow path toward the outer circumferential surface of the nozzle and that partitions the scroll-shaped airflow path is provided in the main body. Therefore, the entire flow of primary air introduced from the primary-air inflow path to the main body can be guided in one direction with the rib, and the primary air can be prevented from flowing backward in the scroll-shaped airflow path. Thus, airflows do not collide with each other in the scroll-shaped airflow path, and it is possible to reliably impart a one-way swirling flow to the primary air to increase the flow speed thereof, thereby enhancing the Venturi effect in the diffuser and improving the performance of the aspirator. Furthermore, it is possible to suppress the occurrence of a difference in performance due to the difference in the inflow direction of air from the primary-air inflow path when the aspirator is used both for a right-hand-drive vehicle and a left-hand-drive vehicle.

In one of the above-described aspirators, the radius of a curved surface that forms the throat portion of the diffuser may be set to at least 4.5 mm.

According to the above-described aspect, the radius of the curved surface forming the throat portion of the diffuser is set to at least 4.5 mm. As is clear from the CFD (computational fluid dynamics) analysis results shown in FIG. 6, it is possible to greatly increase the flow speed of secondary air aspirated into the portion where the temperature sensor is installed and to increase the amount thereof. Thus, it is possible to aspirate a sufficient amount of air into the sensor-installed portion to make the air flow thereto, thereby improving the temperature detection accuracy with the sensor.

In one of the above-described aspirators, an axial length of the throat portion of the diffuser may be set to 4 to 6 mm, which corresponds to the sum of axial dimensions between the tip portion of the nozzle and the edge of radius R on the curved surface with the radius forming the throat portion.

According to the above-described aspect, the axial length of the throat portion of the diffuser where the tip portion of the nozzle is disposed is set to 4 to 6 mm, which corresponds to the sum of the axial dimensions between the tip portion of the nozzle and the radius the edge of R on the curved surface, which forms the throat portion. Therefore, as is clear from the CFD analysis results shown in FIG. 7, it is possible to greatly increase the flow speed of secondary air aspirated into the portion where the temperature sensor is installed and to increase the amount thereof. Thus, it is possible to aspirate a sufficient amount of air into the sensor-installed portion to make the air flow thereto, thereby improving the temperature detection accuracy with the sensor.

According to one aspect, the present invention provides a vehicle air conditioner that aspirates vehicle interior air into a portion where a vehicle interior temperature sensor is installed via an aspirator and adjusts the temperature of vehicle interior based on a vehicle interior temperature detected by the vehicle interior temperature sensor, in which the aspirator is one of the above-described aspirator; an air pipe that aspirates vehicle interior air via the portion where the vehicle interior temperature sensor is installed is connected to the nozzle of the aspirator; and the primary-air inflow path communicates with an airflow path of the air conditioning unit.

According to the above-described aspect, the aspirator for aspirating vehicle interior air into the portion where the vehicle interior temperature sensor is installed is one of the above-described aspirators, the air pipe that aspirates vehicle interior air via the portion where the vehicle interior temperature sensor is installed is connected to the nozzle of the aspirator, and the primary-air inflow path communicates with the airflow path of the air conditioning unit. Therefore, with the improvement in performance of the aspirator, it is possible to increase the amount of vehicle interior air (secondary air) aspirated into the portion where the vehicle interior temperature sensor is installed, thereby improving the temperature detection accuracy of vehicle interior air. Thus, the controllability and the responsiveness for temperature adjustment performed by the air conditioner can be improved.

Advantageous Effects of Invention

According to the aspirator of the present invention, a flow of primary air introduced from the primary-air inflow path to the main body is guided in one direction by the outer circumferential surface of the nozzle, becomes a swirling flow along the scroll-shaped airflow path, and flows from the open end of the nozzle into the throat portion of the diffuser, and secondary air is aspirated via the nozzle through the Venturi effect in the throat portion. The primary air flowing via the throat portion flows along the inner surface of the diffuser, is reduced in pressure, and flows to the outside. Therefore, it is possible to increase the flow speed of the primary air flowing into the throat portion of the diffuser via the scroll-shaped airflow path, thereby enhancing the Venturi effect in the throat portion and increasing the amount of aspirated secondary air. Therefore, the performance of the aspirator can be improved.

According to the vehicle air conditioner of the present invention, with the improvement in performance of the aspirator, it is possible to increase the amount of vehicle interior air (secondary air) aspirated into the portion where the vehicle interior temperature sensor is installed and to improve the temperature detection accuracy of the vehicle interior air. Therefore, the controllability and the responsiveness for temperature adjustment performed by the air conditioner can be improved.

DESCRIPTION OF EMBODIMENTS

One embodiment of the present invention will be described below with reference to FIGS. 1 to 7.

Figure 1:
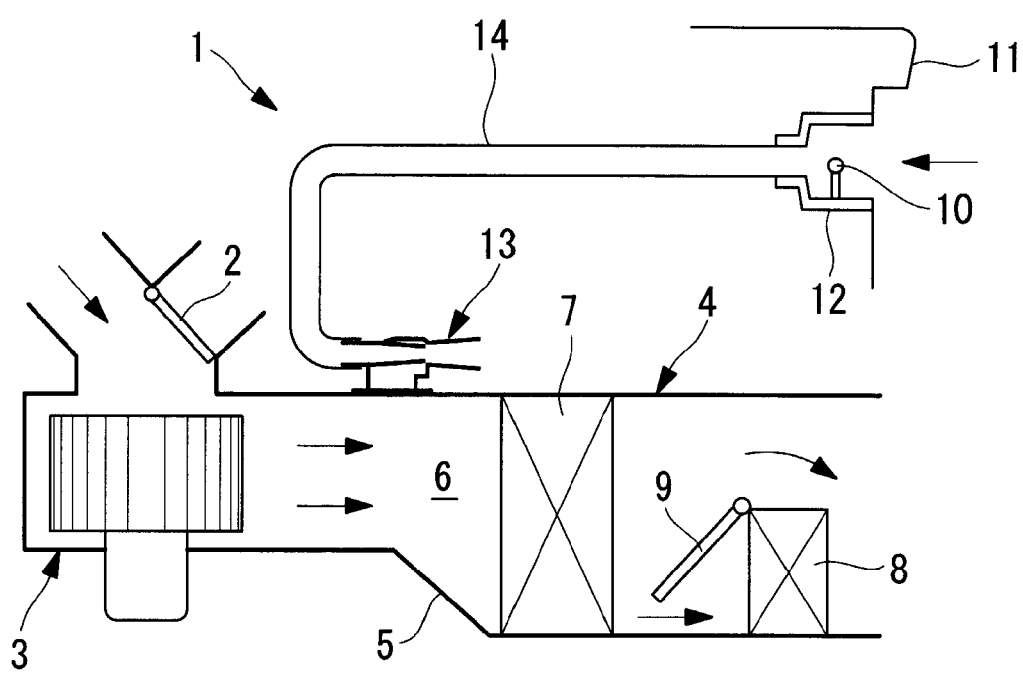
FIG. 1 is an outline structural view of a vehicle air conditioner to which an aspirator according to one embodiment of the present invention is applied.
Figure 2:
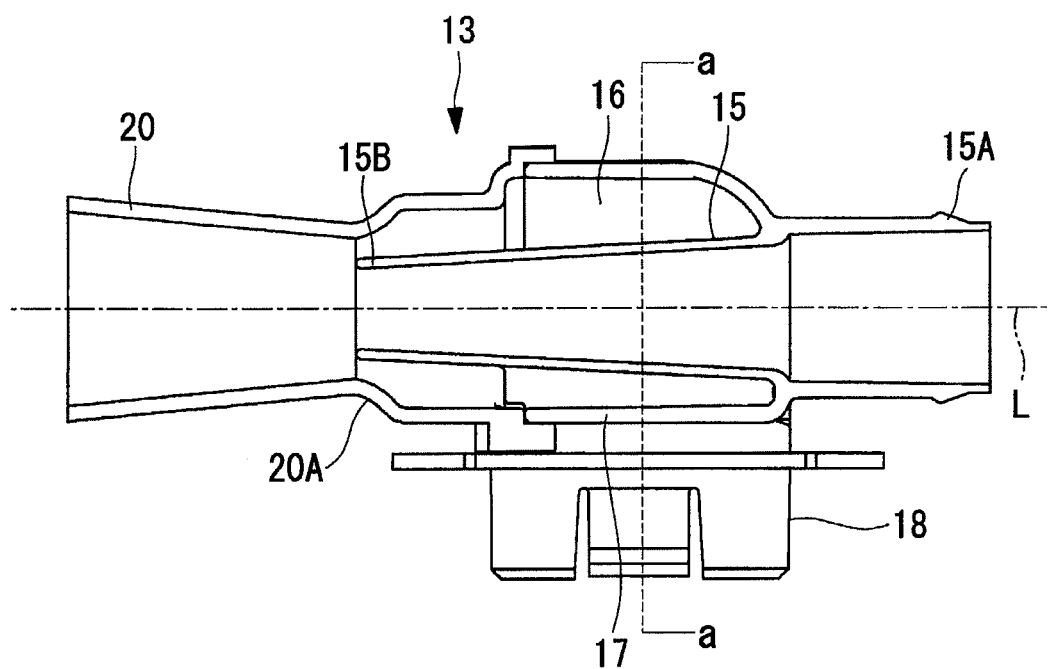
FIG. 2 is a longitudinal sectional view of the aspirator according to the embodiment of the present invention.
Figure 3:
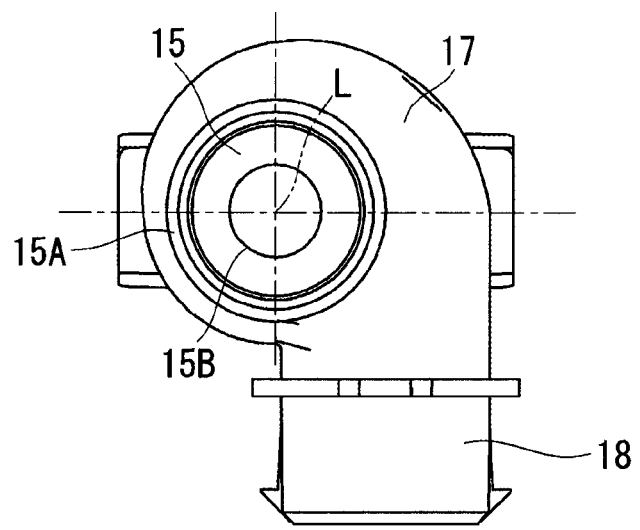
FIG. 3 is a left side view of the aspirator shown in FIG. 2.
Figure 4:
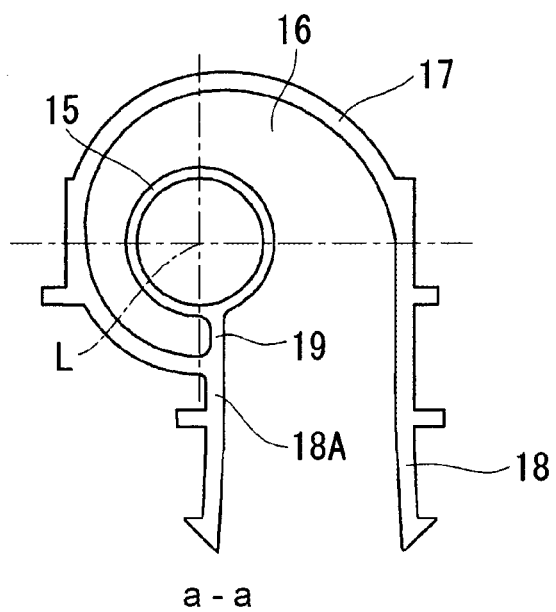
FIG. 4 is a sectional view of the aspirator, shown in FIG. 2, viewed along line a-a.

FIG. 1 is an outline structural view of a vehicle air conditioner.

A vehicle air conditioner 1 has a blower unit 3 that pumps vehicle exterior air (outside air) or vehicle interior air (inside air) introduced via an inside/outside-air switching damper 2 to an air conditioning unit (heating ventilation and air conditioning (HVAC) unit) 4.

The air conditioning unit (HVAC unit) 4 has a structure in which an evaporator 7, a heater core 8, and an air-mixing damper 9 are provided in an airflow path 6 formed by a unit case 5. Air sent from the blower unit 3 is made to flow to the evaporator 7 and the heater core 8 for temperature adjustment, and the air whose temperature has been adjusted is blown out to the vehicle interior selectively from a defroster vent, a face vent, and a foot vent that are provided on the downstream side of the unit case 5, thereby regulating the vehicle interior so as to have a preset temperature.

To adjust the temperature of the vehicle interior to the preset temperature, it is necessary to accurately detect the temperature of the vehicle interior. Thus, it is necessary to make the vehicle interior air sufficiently flow to a sensor-installed portion 12 of an instrument panel 11 where a vehicle interior temperature sensor 10 is installed. Thus, an aspirator 13 that produces a reduced-pressure state through the Venturi effect by using fluid is used. The aspirator 13 is provided at an appropriate position on the air conditioning unit 4, has part of air flowing in the airflow path 6 introduced thereto, and produces the reduced-pressure state through the Venturi effect by using the introduced air as primary air, thereby aspirating vehicle interior air as secondary air from the sensor-installed portion 12 via an air pipe 14 to make the vehicle interior air flow to the sensor-installed portion 12.

Next the structure of the aspirator 13 will be described in detail with reference to FIGS. 2 to 5.

A nozzle 15 that aspirates the vehicle interior air as the secondary air has a connection portion 15A, for the air pipe 14 (see FIG. 1), provided at one end of the nozzle 15 and is formed in a cylindrical shape whose outer diameter is gradually reduced from the connection portion 15A toward a nozzle tip portion 15B formed at the other end thereof. A main body 17 that forms a scroll-shaped airflow path 16 so as to surround the outer circumference of the nozzle 15 is integrally formed on the nozzle 15. A primary-air inflow path 18 that tangentially communicates with the scroll-shaped airflow path 16 is integrally provided on the main body 17.

The primary-air inflow path 18 is disposed in T-shaped fashion so as to be perpendicular to the central axis line L of the nozzle 15 and is provided in a state in which an inner wall 18A of the primary-air inflow path 18 is offset outward from the central axial line L of the nozzle 15 by several millimeters (for example, about 2 to 3 millimeters). A rib 19 that extends from the inner wall 18A of the primary-air inflow path 18 toward an outer circumferential surface of the nozzle 15 and that partitions the scroll-shaped airflow path 16 is integrally provided in the main body 17.

Figure 5:
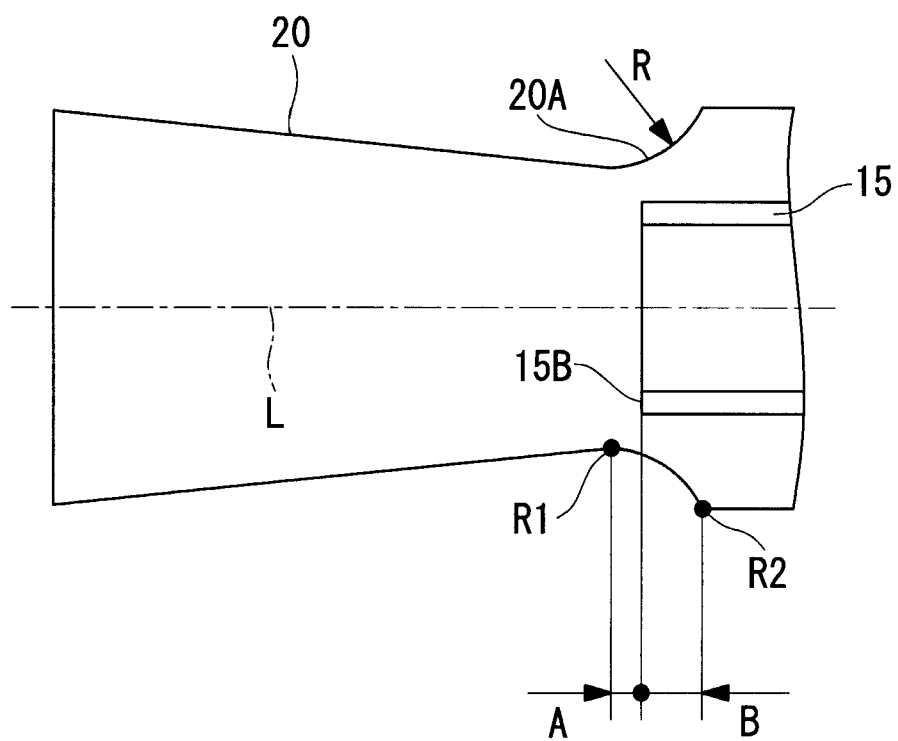
FIG. 5 is an enlarged sectional view of a diffuser portion of the aspirator shown in FIG. 2.
Figure 6:
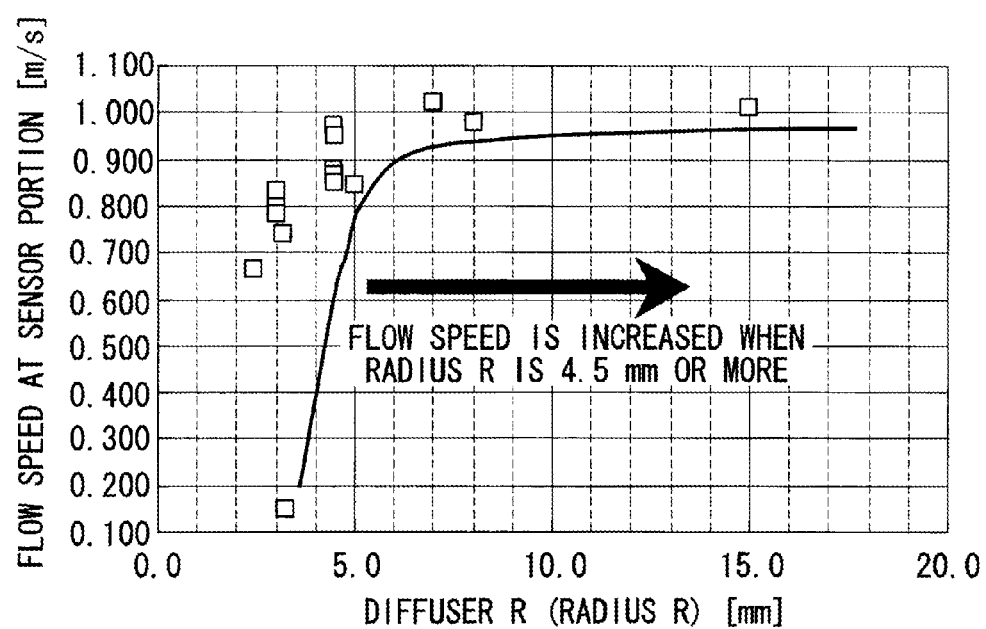
FIG. 6 is a CFD analysis diagram of the relationship between the radius of a throat portion of the aspirator shown in FIG. 2 and the flow speed at a sensor-installed portion.
Figure 7:
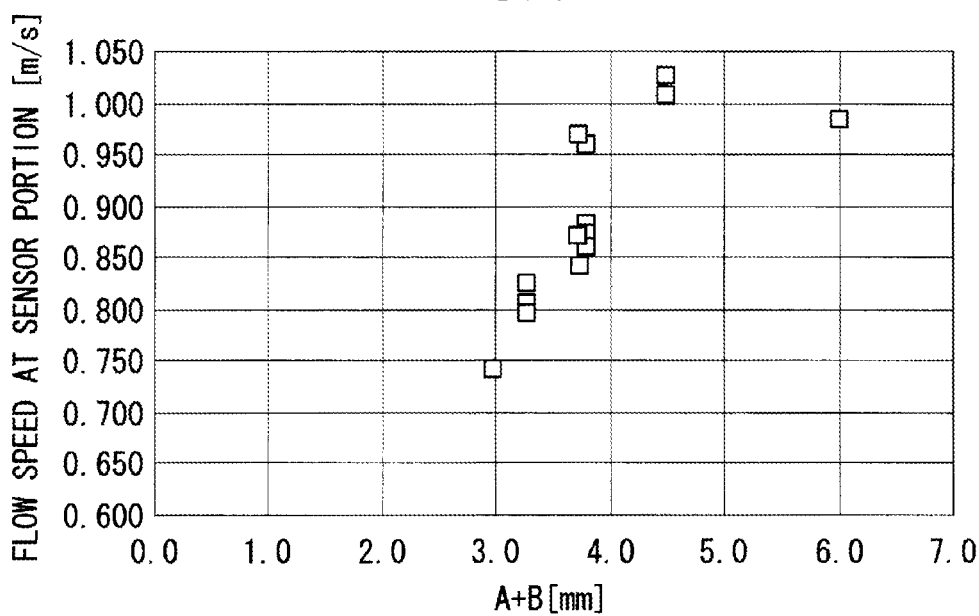
FIG. 7 is a CFD analysis diagram of the relationship between the axial length of the throat portion of the aspirator shown in FIG. 2 and the flow speed at the sensor-installed portion.

A diffuser 20 is connected to an open end of the main body 17. The diffuser 20 has a throat portion 20A whose inner diameter is narrowed down with a curved surface corresponding to the place where the tip portion 15B of the nozzle 15 opens. The diffuser 20 has a shape in which the inner diameter is gradually expanded in a tapered shape from the throat portion 20A toward the tip of the diffuser 20. As shown in FIG. 5, the throat portion 20A of the diffuser 20 is formed of a curved surface with a radius R that is equal to or larger than 4.5 mm.

The tip portion 15B of the nozzle 15 is disposed within the axial length of the throat portion 20A, which is formed of the curved surface with the radius R, in the diffuser 20. The axial length of the throat portion 20A is indicated by the sum A+B of axial dimensions A and B between the tip portion 15B of the nozzle 15 and R1 and R2 of the edge of R on the curved surface with the radius R. In this embodiment, the axial length of the throat portion 20A is set to 4 to 6 mm and is preferably set to 4.5 mm.

According to this embodiment, the following advantages are afforded with the above-described structure.

When the operation of the vehicle air conditioner 1 is started and the blower unit 3 is rotationally driven, outside air or inside air is introduced to the vehicle air conditioner via the inside/outside-air switching damper 2. This air is pumped from the blower unit 3 to the air conditioning unit (HVAC unit) 4 disposed at the downstream side, is adjusted so as to have a preset temperature via the evaporator 7, the heater core 8, and the air-mixing damper 9, and is then blown out to the vehicle interior. As a result, the temperature of the vehicle interior is adjusted to the preset temperature.

Although the vehicle air conditioner 1 is controlled such that the temperature of the vehicle interior is set to the preset temperature, in order to improve the controllability and the responsiveness, it is necessary not only to improve the performance of the vehicle air conditioner 1 but also to accurately detect the vehicle interior temperature. The vehicle interior temperature is detected by the vehicle interior temperature sensor 10 installed at the sensor-installed portion 12 of the instrument panel 11. In order to improve the detection accuracy, it is necessary to make a sufficient amount of vehicle interior air flow to the sensor-installed portion 12.

The aspirator 13 is used to aspirate air from the vehicle interior into the sensor-installed portion 12 to make the air flow thereto. The aspirator 13 has part of the airflow from the airflow path 6 of the air conditioning unit 4 introduced thereto via the primary-air inflow path 18, as primary air. In the aspirator 13, the inner wall 18A of the primary-air inflow path 18, which tangentially communicates with the scroll-shaped airflow path 16 formed on the outer circumference of the nozzle 15 by the main body 17, is offset outward from the center of the nozzle 15, which aspirates secondary air, and the primary air introduced from the primary-air inflow path 18 flows into the scroll-shaped airflow path 16 from one direction.

Thus, the flow of the primary air introduced from the primary-air inflow path 18 to the main body 17 is guided in one direction by the outer circumferential surface of the nozzle 15, becomes a swirling flow along the scroll-shaped airflow path 16, and flows from the open end of the main body 17 into the throat portion 20A of the diffuser 20, and secondary air is aspirated via the nozzle 15 through the Venturi effect in the throat portion 20A. The primary air flowing via the throat portion 20A flows along the inner surface of the diffuser 20, is reduced in pressure, and flows to the outside. Thus, it is possible to increase the flow speed of the primary air flowing into the throat portion 20A of the diffuser 20 via the scroll-shaped airflow path 16, thereby enhancing the Venturi effect in the throat portion 20A and increasing the amount of aspirated secondary air.

As a result, the amount of vehicle interior air (secondary air) aspirated via the air pipe 14 from the sensor-installed portion 12, where the vehicle interior temperature sensor 10 is installed, is increased, thereby making it possible to increase the amount of vehicle interior air flowing around the vehicle interior temperature sensor 10 and to improve the detection accuracy of the vehicle interior temperature. Therefore, the controllability and the responsiveness for temperature adjustment performed by the vehicle air conditioner 1 can be improved.

In particular, in the aspirator 13 of this embodiment, since the rib 19, which extends from the inner wall 18A of the primary-air inflow path 18 toward the outer circumferential surface of the nozzle 15 and which partitions the scroll-shaped airflow path 16, is provided in the main body 17, the entire flow of primary air introduced from the primary-air inflow path 18 to the main body 17 can be guided in one direction with the rib 19. Thus, it is possible to block the primary air from flowing backward in the scroll-shaped airflow path 16 and to prevent the collision of airflows in the airflow path 16.

Therefore, it is possible to reliably impart a one-way swirling flow to the primary air to increase the flow speed of the primary air, thereby enhancing the Venturi effect in the diffuser 20 and further improving the performance of the aspirator 13. Since the entire flow of primary air can be guided in one direction with the rib 19, it is possible to suppress the occurrence of a difference in performance due to the difference in the direction of airflow from the primary-air inflow path 18 when the aspirator 13 is used for both a right-hand-drive vehicle and a left-hand-drive vehicle.

In the above-described aspirator 13, the radius R of the curved surface, which forms the throat portion 20A of the diffuser 20, is set to at least 4.5 mm. Therefore, as is clear from the CFD (computational fluid dynamics) analysis results shown in FIG. 6, it is possible to greatly increase the flow speed of secondary air aspirated into the sensor-installed portion 12 of the vehicle interior temperature sensor 10 to 0.9 to 1.0 m/s (CFD result) and to increase the amount thereof. Therefore, with this structure, it is also possible to aspirate a sufficient amount of air into the sensor-installed portion 12 to make the air flow thereto, thereby improving the temperature detection accuracy of the vehicle interior air (secondary air) with the vehicle interior temperature sensor 10.

Similarly, the axial length of the throat portion 20A of the diffuser 20, where the tip portion 15B of the nozzle 15 is disposed, is set to 4 to 6 mm, which is indicated by the sum (A+B) of the axial dimensions A and B between the tip portion 15B of the nozzle 15 and the R1 and R2 of the edge of R on the curved surface with the radius R, which forms the throat portion 20A. Therefore, as is clear from the CFD analysis results shown in FIG. 7, it is possible to greatly raise the flow speed of secondary air aspirated into the sensor-installed portion 12 of the vehicle interior temperature sensor 10 to 0.95 to 1.05 m/s (CFD result) and to increase the amount of secondary air. Therefore, with this structure, it is also possible to aspirate a sufficient amount of air into the sensor-installed portion 12 to make the air flow thereto, thereby improving the temperature detection accuracy of vehicle interior air (secondary air) with the vehicle interior temperature sensor 10.

The present invention is not limited to the above-described embodiment, and appropriate modifications can be made without departing from the scope thereof. For example, in the above-described embodiment, a description has been given of an example case where the aspirator 13 is provided on the air conditioning unit 4 at the upstream side of the evaporator 7; however, the aspirator 13 may be provided at any position as long as air is always flowing there. The position where the vehicle interior temperature sensor 10 is installed is not limited to the position in the above-described embodiment.

A description has been given of an example case where the nozzle 15, the main body 17, and the primary-air inflow path 18 are integrally provided in the aspirator 13; however, an appropriate combination of the nozzle 15, the main body 17, the primary-air inflow path 18, and the diffuser 20 may be integrally provided or they may be separately provided.

The invention claimed is:

1. An aspirator comprising:
    a nozzle that aspirates secondary air;
    a main body that is provided so as to surround the outer circumference of the nozzle and that forms a scroll-shaped airflow path around the nozzle;
    a primary-air inflow path, an outer wall of which tangentially communicates with an outer wall of the scroll-shaped airflow path; and
    a diffuser that is connected to an open end of the main body and has a throat portion at which a tip portion of the nozzle is disposed,
    wherein an entire length of an inner wall of the primary-air inflow path, which communicates with the scroll-shaped airflow path, is entirely offset outward from the center of the nozzle; and
    only a single rib is integrally formed with the main body and that extends from the inner wall of the primary-air inflow path to an outer circumferential surface of the nozzle, said single rib offset on the same side of the center of the nozzle as the outer wall of the primary-air inflow path, and that partitions the scroll-shaped airflow path is configured to introduce all of the primary air from the primary-air flow path to the main body in one direction so as to transmit a swirling flow of the primary-air in the one direction.

2. The aspirator according to claim 1, wherein a radius of a curved surface that forms the throat portion of the diffuser is set to at least 4.5 mm.

3. The aspirator according to claim 1, wherein an axial length of the throat portion of the diffuser is set to 4 to 6 mm, which corresponds to the sum of axial dimensions between the tip portion of the nozzle and an edge of R on a curved surface with two end points of the curved surface forming the throat portion.

4. A vehicle air conditioner that aspirates vehicle interior air into a portion where a vehicle interior temperature sensor is installed via an aspirator and adjusts the temperature of vehicle interior based on a vehicle interior temperature detected by the vehicle interior temperature sensor,
    wherein the aspirator is the aspirator according to claim 1;
    an air pipe that aspirates vehicle interior air via the portion where the vehicle interior temperature sensor is installed is connected to the nozzle of the aspirator; and
    the primary-air inflow path, an outer wall of which communicates with an outer wall of an airflow path of the air conditioning unit.

* * * * *